US009600266B2

(12) United States Patent
Molin et al.

(10) Patent No.: US 9,600,266 B2
(45) Date of Patent: Mar. 21, 2017

(54) METHODS AND APPARATUS FOR UPDATING SOFTWARE COMPONENTS IN COORDINATION WITH OPERATIONAL MODES OF A MOTOR VEHICLE

(71) Applicant: BENDIX COMMERCIAL VEHICLE SYSTEMS, LLC, Elyria, OH (US)

(72) Inventors: Hans M. Molin, Mission Viejo, CA (US); Ananda Pandy, Rochester Hills, MI (US); William P. Amato, Avon, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 0 days.

(21) Appl. No.: 14/646,880

(22) PCT Filed: Dec. 5, 2012

(86) PCT No.: PCT/US2012/067925
§ 371 (c)(1),
(2) Date: May 22, 2015

(87) PCT Pub. No.: WO2014/088567
PCT Pub. Date: Jun. 12, 2014

(65) Prior Publication Data
US 2015/0309784 A1 Oct. 29, 2015

(51) Int. Cl.
G05B 19/00 (2006.01)
G06F 9/445 (2006.01)
(Continued)

(52) U.S. Cl.
CPC ............. G06F 8/65 (2013.01); B60T 8/176 (2013.01); F01N 9/002 (2013.01)

(58) Field of Classification Search
CPC B60T 7/22; B60R 25/04; B60R 24/23; B60R 25/34; H04L 67/12
(Continued)

(56) References Cited

U.S. PATENT DOCUMENTS 5,442,553 A 8/1995 Parrillo
5,999,740 A 12/1999 Rowley
(Continued)

FOREIGN PATENT DOCUMENTS

WO 2007078944 7/2007

OTHER PUBLICATIONS

International Preliminary Report on Patentability (IPRP) for International Application No. PCT/US2012/067925 dated Jun. 18, 2015 (10 pages).
(Continued)

Primary Examiner — Dalena Tran
(74) Attorney, Agent, or Firm — Tucker Ellis LLP

(57) ABSTRACT

Methods and apparatus are provided for updating at least one software component of a motor vehicle in coordination with predetermined safe operational modes of the vehicle permitting the updating without danger to a driver operating the motor vehicle. The method operates such that a receiver circuit of a hub controller of the motor vehicle receives and stores a software update module in a memory of the hub controller. A processor of the hub controller determines an operational condition of the motor vehicle and selectively updates at least one software component of the motor vehicle with the software update module responsive to the operational condition of the motor vehicle being in a predetermined safe operational mode permitting the updating without danger to a driver operating the motor vehicle.
(Continued)

Preferably, the updating of the at least one software component with the software update module takes place only during DPF regeneration.

20 Claims, 9 Drawing Sheets

(51) Int. Cl.
*B60T 8/176* (2006.01)
*F01N 9/00* (2006.01)

(58) Field of Classification Search
USPC ........... 701/71, 2, 24, 36; 340/5.22, 4.3, 5.2; 717/114
See application file for complete search history.

(56) References Cited

U.S. PATENT DOCUMENTS

| | | | |
|---|---|---|---|
| 6,434,455 B1 | 8/2002 | Snow et al. | |
| 6,487,717 B1 | 11/2002 | Brunemann et al. | |
| 6,687,587 B2 | 2/2004 | Kacel | |
| 6,725,652 B2 | 4/2004 | Sakaguchi | |
| 6,904,325 B2 | 6/2005 | Shi et al. | |
| 6,958,611 B1 | 10/2005 | Kramer | |
| 6,975,612 B1 | 12/2005 | Razavi et al. | |
| 7,092,803 B2 | 8/2006 | Kapolka et al. | |
| 7,155,321 B2 | 12/2006 | Bromley et al. | |
| 7,366,589 B2 | 4/2008 | Habermas | |
| 7,506,309 B2 | 3/2009 | Schaefer | |
| 7,729,813 B2 | 6/2010 | Frashure | |
| 8,561,054 B2 * | 10/2013 | Smirnov | G06F 8/64 717/120 |
| 8,880,289 B2 * | 11/2014 | Uehara | G06F 9/445 701/36 |
| 2002/0035429 A1 | 3/2002 | Banas | |
| 2003/0230076 A1 | 12/2003 | Kwon | |
| 2007/0185624 A1 * | 8/2007 | Duddles | G06F 8/665 701/1 |
| 2010/0275580 A1 | 11/2010 | Abraham et al. | |
| 2011/0000193 A1 | 1/2011 | Paterson et al. | |
| 2011/0130917 A1 | 6/2011 | Genssle et al. | |
| 2011/0307336 A1 | 12/2011 | Smirnov et al. | |

OTHER PUBLICATIONS

International Search Report and Written Opinion (ISR/WO) for International Application No. PCT/US12/67925 dated Mar. 12, 2013 (11 pages).

* cited by examiner

METHODS AND APPARATUS FOR UPDATING SOFTWARE COMPONENTS IN COORDINATION WITH OPERATIONAL MODES OF A MOTOR VEHICLE

TECHNICAL FIELD

The embodiments herein relate generally to vehicular fleet management and control. More specifically, particular embodiments relate to fleet monitoring and maintenance, and to methods and systems for motor vehicle monitoring and maintenance by providing fleet vehicles with updates of software components of subsystems from a central server and for installing the updates in coordination with selected operational modes of the individual vehicles.

BACKGROUND

Many modern fleet vehicles carry highly specialized computers required for operating the vehicles in the form of one or more electronic control units (ECUs) disposed in one or more vehicle subsystems such as, for example, radar subsystems, anti-lock brake subsystems (ABS), camera subsystems, vehicle dashboard subsystems, automatic cruise control (ACC) subsystems, tire pressure monitoring systems (TPMS), and the like. The vehicles of this type also typically carry and use highly specialized communication systems for communicating via satellite, cellular links, or the like with associated wireless or wired hosts such as centralized servers located at a remote home base, for example.

It is to be appreciated that the ECUs each comprise not only hardware components but also software or, more specifically, software components. The software components may include one or more of each of active, passive, or other components. Active software components may include executable code segments, for example, and passive software components may include parameters, databases or other collections of data or the like used by the active software components, for example. Other software components may include software update version data relating to the software version levels of the active or passive components or relating to hardware and/or firmware installed in each of the ECUs.

Over the life of the vehicles the software components may need updates in order to ensure compatibility of the various subsystems of the vehicle with evolving or changing operating conditions such as vehicle age, to adapt the vehicle for service in a range of environments or for other reasons. Also, certain parameters may be changed as a matter of personal or corporate preference or policy such as, for example, parameters in tire pressure monitoring systems (TPMS), following distance determination systems, panic brake monitoring system, or the like.

Current methods for implementing the updating of software components in motor vehicles generally include wired or wireless update techniques. Wired updates typically require a physical visit of the vehicle to a service center whereat selected one or more software updates may be downloaded by an authorized trained technician into a hub controller operatively coupled with one or more subsystems or downloaded directly into a selected subsystem from a host computer, such as a laptop or specialized update computer console device. This procedure is costly and adds delay to the software update roll out across a fleet of vehicles.

Wireless updates utilize one or more wireless transceivers of a hub controller coupled with the vehicle subsystems or of the vehicle subsystems to communicate selected software update modules from a remote host server to the hub controller or subsystem directly using one or more wireless network technologies, such as cellular networks, satellite communications, WiFi networks, or the like.

However, the timing of the wireless updates has the potential of interfering with normal operation of the target vehicle. It is highly desirable to perform software update operations in some subsystems such as ABS subsystems, for example, while the vehicle is not in operation wherein a loss of that function during the software update could result in adverse vehicle handling consequences. Also, it is undesirable to suspend vehicles from service whenever a wireless update becomes available.

In addition, with regard to vehicle subsystems, many modern fleet vehicles use Diesel Particulate Filters ("DPFs") to filter and collect particulate matter from the exhaust gases of diesel engines to prevent the particulate matter from exiting the tailpipe. After a period of operation, and prior to clogging, the DPF filter needs to be replaced or removed for cleaning the collected particulate matter. However, since replacement and removing for cleaning is costly and not practical, many filters are cleaned on-board using a process known as "regeneration." DPF regeneration is a process where temperatures of the exhaust gases are made high enough to combust the carbon particulates within the filter. Typically, the DPFs are regenerated in fleet vehicles either by: 1) driving constantly at a higher speed until the regeneration is complete; or 2) using a special protocol actively raising the exhaust gas temperature to facilitate regeneration while the vehicle is parked or otherwise immobilized until the regeneration protocol is complete usually taking about twenty (20) minutes. The DPF regeneration process is typically performed often in commercial vehicles in order to maintain proper operation of the vehicle.

It would be further desirable, therefore, to provide a detailed fleet software maintenance system that provides an overall implementation designed to focus on safety and efficiency, and to provide a software server architecture and corresponding web applications providing an interface for efficient software maintenance operation.

BRIEF SUMMARY OF THE EMBODIMENTS

In accordance with an example embodiment, software updating is coordinated with a predetermined safe operational mode of the vehicle permitting transparent updating to both the driver as well as to the commercial aspects of vehicle operation.

In accordance with a further example embodiment, software updating is coordinated with a DPF regeneration operational mode of the vehicle permitting the updating without adversely affecting the driver operating the motor vehicle and without loss of revenues relative to the cargo transport.

In accordance with various example embodiments to be described, referred to herein as a fleet software maintenance system, trucks, cars, and any other vehicles are configured to receive one or more software update modules from one or more selected service providers via one or more wireless or other technologies. Servers selectively periodically poll vehicle configuration information, process it, and then present the trucks, cars, and any other vehicles of the fleet with one or more software update modules for updating one or more software components of one or more vehicle subsystems of the vehicles. The updating is performed locally by a hub controller or other processing device of the respective vehicles in a coordinated fashion relative to the motor vehicle being in one or more predetermined safe operational modes permitting the updating without adversely affecting the ability of the driver operating the motor vehicle to transport cargo and without loss of revenues relative to the cargo transported owing to vehicle down-time or the like. In an example embodiment, in vehicles equipped with a diesel particulate filter (DPF) regeneration subsystem, one predetermined safe operational mode permitting the updating without danger to a driver operating the motor vehicle is during the DPF regeneration operation wherein the vehicle may remain non-operational for extended periods of time, such as for example, twenty (20) minutes.

Since the DPF regeneration process is typically performed often in commercial vehicles in order to maintain proper operation of the vehicle, it would be desirable, therefore, to utilize the vehicle down-time during the DPF regeneration process to also serve as a convenient and desirable opportunity to download and/or to update various software components of the vehicles.

In accordance with one aspect of a system applying principles of the embodiments herein, fleet managers or other supervisory users are provided with a way of monitoring vehicles in a fleet for determining the need for updating one or more software components of various subsystems of the fleet vehicles for enhancing driver and vehicle performance. The subject fleet management and maintenance system platform accomplishes these objects and others in a system and method through which supervisory users are able to track vehicle software update information and to selectively download updates to the fleet wirelessly from a central server for installation into the vehicle subsystems in accordance with local operational modes of the respective vehicles on a local vehicle level.

In accordance with another aspect of a system applying principles of the embodiments herein, a hub controller of an associated motor vehicle is configured to coordinate an update of at least one software component of the motor vehicle with an operational condition of the motor vehicle. A receiver circuit of the hub controller receives an update as a telematics download from a host via a wireless network. The software update module is stored in a memory of the hub controller. A processor of the hub controller determines an operational condition of the motor vehicle. In the example embodiment, the processor determines a DPF regeneration operational mode. Thereafter, the processor selectively updates at least one software component of the motor vehicle with the software update module responsive to the operational condition of the motor vehicle being in the predetermined safe operational mode permitting the updating without danger to a driver operating the motor vehicle.

Other embodiments, features and advantages of the example embodiments will become apparent from the following description of the embodiments, taken together with the accompanying drawings, which illustrate, by way of example, the principles of the example embodiments.

DETAILED DESCRIPTION OF EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

Figure 1:
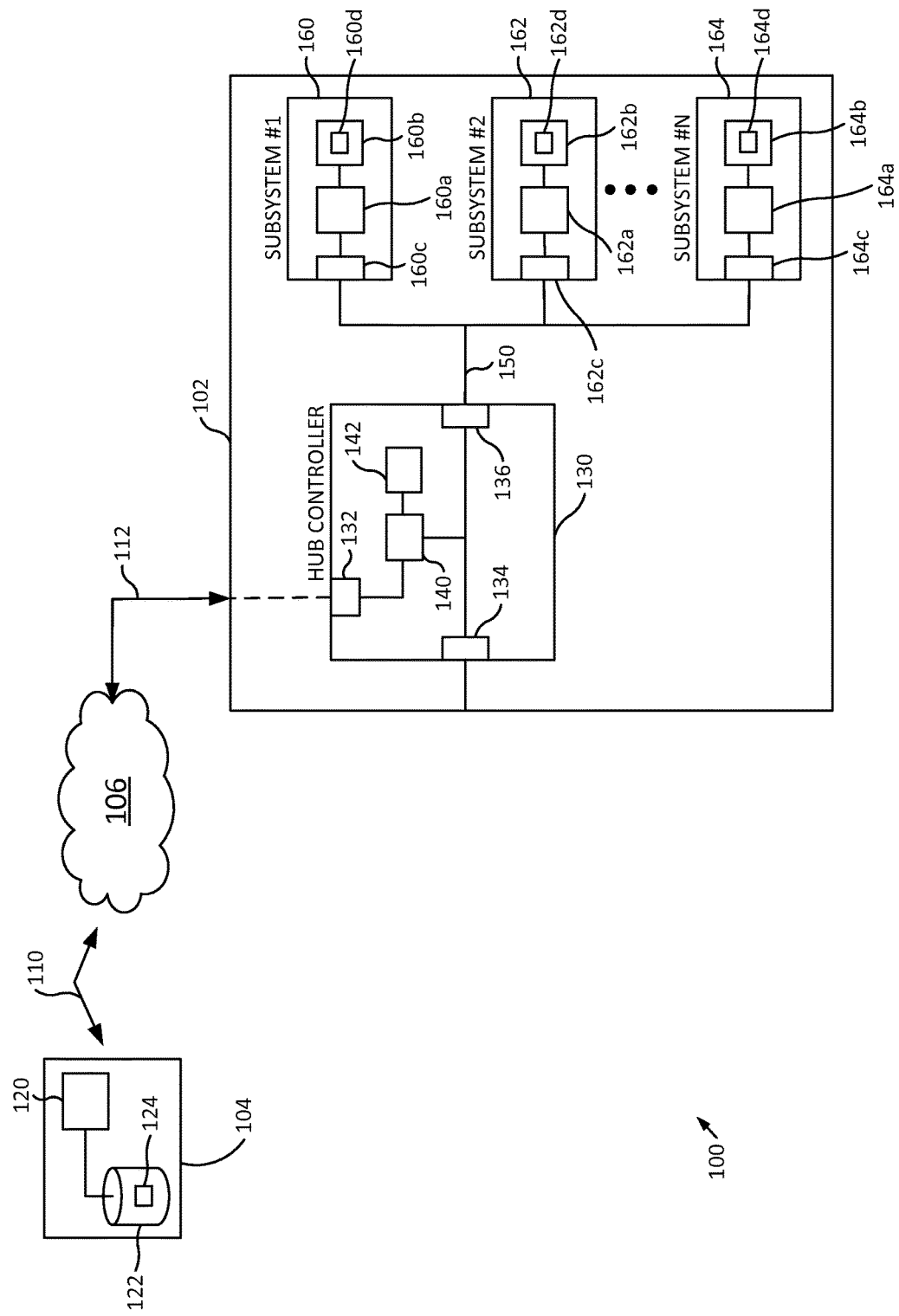
FIG. 1 is a schematic overview diagram of a fleet software maintenance system and network layout according to an example embodiment.

FIG. 1 is an overview of a fleet software management and reporting system 100 in accordance with the example embodiment. The system 100 includes a plurality of fleet vehicles 102 (only one shown) in operative communication with an update software host 104 using one or more intermediate networks 106. The host 104 is in operative communication with the network 106 by one or more communication links 110. Correspondingly, the fleet vehicles 102 are in operative communication with the network 106 by one or more communication links 112. The one or more intermediate networks 106 may be one or more telematics networks using any technology now known or hereinafter developed including, for example, satellite communication technology.

In the example embodiment, the host 104 includes a server computer 120 operatively coupled with one or more databases 122 whereat one or more software update modules 124 may be stored. The server computer 120 is operable to determine software revision levels for the vehicles 102 and to selectively deliver the one or more software update modules 124 to the vehicles 102 via the network 106 for updating selected software components of the vehicles in a manner to be described below.

Communication between the vehicles 102 and the host 104 may use any technology now known or hereinafter developed. In the example embodiment, however, cellular communication technology and protocols are used. Satellite and/or WiFi communication technologies and protocols may also be used as well as necessary or desired. The services of one or more commercial telematics providers may be used as convenient intermediary handlers of the update data as necessary or desired.

With continued reference to FIG. 1, each of the plurality of fleet vehicles 102 includes a hub controller 130 provided with a wireless transceiver 132 for operative communication with the network 106 via links 112, a wired transceiver 134 for operative communication with an associated portable update computer, such as a laptop computer (not shown), and a network transceiver 136 for operative communication with a plurality of vehicle subsystems 160-164 via an intermediary vehicle network 150. The intermediary vehicle network 150 may be a vehicle serial bus network such as, for example, a J1939 local network or any equivalent thereof. Preferably, the hub controller 130 includes non-transitory memory 142 operatively coupled with a processor 140 wherein the memory 142 is adapted to store logic executable by the processor 140 to perform updates to the subsystems 160-164 in accordance with the example embodiments to be described herein.

Each subsystem 160-164 includes a processor 160a-164a operatively coupled with a memory 160b-164b and a bus transceiver 160c-164c providing a common link between the processors 160a-164a and the hub controller 130 via the vehicle bus or local network 150.

In the example embodiment, at least one of the subsystems 160-164 is a diesel particulate filter (DPF) regeneration subsystem device of the motor vehicle 102. The DPF regeneration subsystem device is operable to generate a signal representative of the DPF regeneration subsystem device commencing a DPF regeneration operation in the motor vehicle 102, wherein the signal is preferably communicated to the hub controller 130 via the vehicle local bus 150. In a further example embodiment, the DPF regeneration subsystem device is operable to generate a signal representative of the DPF regeneration subsystem device performing the DPF regeneration operation in the motor vehicle 102, wherein the signal is preferably communicated to the hub controller 130 via the vehicle local bus 150.

Overall, however, in the example embodiment, the hub controller 130 of the associated motor vehicle 102 is configured to execute logic stored in the memory 142 thereof, for performing an operation of coordinating an update of at least one software component of the motor vehicle with an operational condition of the motor vehicle. The hub controller 130 receives, by the receiver circuit 132 of the hub controller a telematic download via the network 106 of a software update module 400 (FIG. 4), and stores the software update module in the memory 142 of the hub controller 130. Further, the hub controller 130 is operable to determine by the processor 140 of the hub controller an operational condition of the motor vehicle 102. Thereafter, the hub controller selectively updates the at least one software component of selected one or more of the motor vehicle subsystems 160-164 by the processor with the software update module responsive to the operational condition of the motor vehicle being in a predetermined safe operational mode permitting the updating without danger to a driver operating the motor vehicle.

More particularly, in accordance with the example embodiment, the hub controller 130 determines whether the vehicle is in a DPF regeneration cycle or mode of operation. The hub controller receives a signal from an associated diesel particulate filter (DPF) regeneration subsystem device of the motor vehicle, preferably via the vehicle local bus 150, wherein the signal is representative of the DPF regeneration device commencing a DPF regeneration operation. Alternatively, the signal may simply represent an active DPF regeneration operation in the vehicle rather than an initiation event. That is, in this alternative example, the signal is representative of the DPF regeneration device performing a DPF regeneration operation. In the example embodiment, the updating includes updating at least one software component of the motor vehicle by the processor 140 with the software update module 400 (FIG. 4) responsive to receiving the signal representative of the DPF regeneration subsystem device commenced or is actively using and/or executing the DPF regeneration operation.

It is to be appreciated that the time interval from initiation to completion of a DPF regeneration operation in trucks is about twenty (20) minutes and, further, that during the DPF regeneration operation the trucks are typically parked and are rendered or placed in a safe non-operational mode.

Although the typical DPF regeneration operation time should provide adequate time for updating one or more of the software components of the motor vehicle 102 with a software update module comprising in an example embodiment plural software update modules for updating a corresponding set of software components of the motor vehicle, it is important to ensure that the update time required for performing the updates does not exceed the available time of vehicle non-use during the DPF regeneration operation. Along these lines and in accordance with the example embodiment, the hub controller 130 is operable to determine by the processor 140 of the hub controller an estimated update time parameter representative of an update time period required for updating the at least one software component of the motor vehicle with the one or more software update modules. Simple updates of subsystem operational or other parameters is typically straightforward and consumes little time. However, updates to large executable files or other logic of the subsystems might take considerable time. As a further example, re-flashing programmable logic relative to the one or more vehicle subsystems might require considerable additional time as well. The processor of the hub controller further determines an estimated safe operational mode time parameter representative of a window time period available for updating the at least one software component of the motor vehicle with the software update module while the motor vehicle is in the predetermined safe operational mode, namely the DPF regeneration operation mode. Thereafter, responsive to determining that the estimated safe operational mode time parameter representative of the window time period available for updating the at least one software component is greater than the estimated update time parameter representative of the update time period required for updating the at least one software component, the software component of the motor vehicle is updated with the contents of the software update module.

In addition, the software update module stored in the memory 142 of the hub controller may contain a plurality of update software components.

Along these lines and in accordance with the example embodiment, the hub controller 130 is further operable to receive a software update module including or containing a plurality of update software components, wherein each of the plurality of update software components may be directed to updating corresponding ones of a plurality of subsystem software components of subsystem devices 160-164 of the associated motor vehicle 102 operatively coupled with the hub controller 130. The hub controller determines the operational condition of the motor vehicle being in the predetermined safe operational mode, i.e., in the DPF regeneration operation in the example embodiment and, thereafter, selectively updates at least one subsystem software component of a corresponding subsystem device of the motor vehicle with a corresponding update software component of the software update module. This permits the updating without danger to the driver operating the motor vehicle.

In some cases the time required for performing the updates when there are plural update software components may exceed the time available during the DPF regeneration operation.

Along these lines and in accordance with the example embodiment, the hub controller 130 is further operable to determine a plurality of estimated update time parameters representative of a corresponding plurality of update time periods required for updating the plurality of subsystem software components of the subsystem devices of the motor vehicle with the plurality of update software components of the software update modules. The hub controller further determines an estimated safe operational mode time parameter representative of a window time period available for updating the plurality of subsystem software components of the motor vehicle with the plurality of update software components of the software update module while the motor vehicle is in the DPF regeneration operational mode. When there are more updates than can be accommodated within the DPF regeneration window, only selected updates are performed wherein remaining updates are stored for later use during a subsequent DPF regeneration operation. More particularly, a first set of the plurality of subsystem software components of the subsystem devices of the motor vehicle are updated with a corresponding first set of the plurality of update software components of the software update modules in accordance with a sum of the estimated update time parameters corresponding to the first set of the plurality of update software components being less than the estimated safe operational mode time parameter representative of the window time period available for the updating. Updating others of the plurality of subsystem software components not in the first set is deferred, wherein the others of the plurality of subsystem software components not in the first set are stored in the memory 142 of the hub controller. As used herein, a "set" is a collection of one or more items, objects, or any one or things such as, for example, a collection of one or more software update modules, wherein the one or more items, objects, things or software update modules need not necessarily be the same, different or mutually exclusive.

Yet still further, in addition, the software update module stored in the memory 142 of the hub controller may contain a plurality of update software components wherein an update interdependence relationship may exist between selected one of the plurality of update software components. For example, a radar subsystem parameter may need to be updated before a driver warning subsystem parameter can be updated.

Along these lines, and in accordance with the example embodiment, the hub controller 130 is further operable to determine an update interdependence relationship between first and second update software components of the plurality of update software components, wherein the second update software component requires the first update software component for operation of the second update software component. The hub controller is operative to selectively update the plurality of subsystem software components with the plurality of update software components in accordance with the update interdependence relationship, wherein the first subsystem software component is updated with the first update software component prior to the second subsystem software component is updated with the second update software component.

Figure 2:
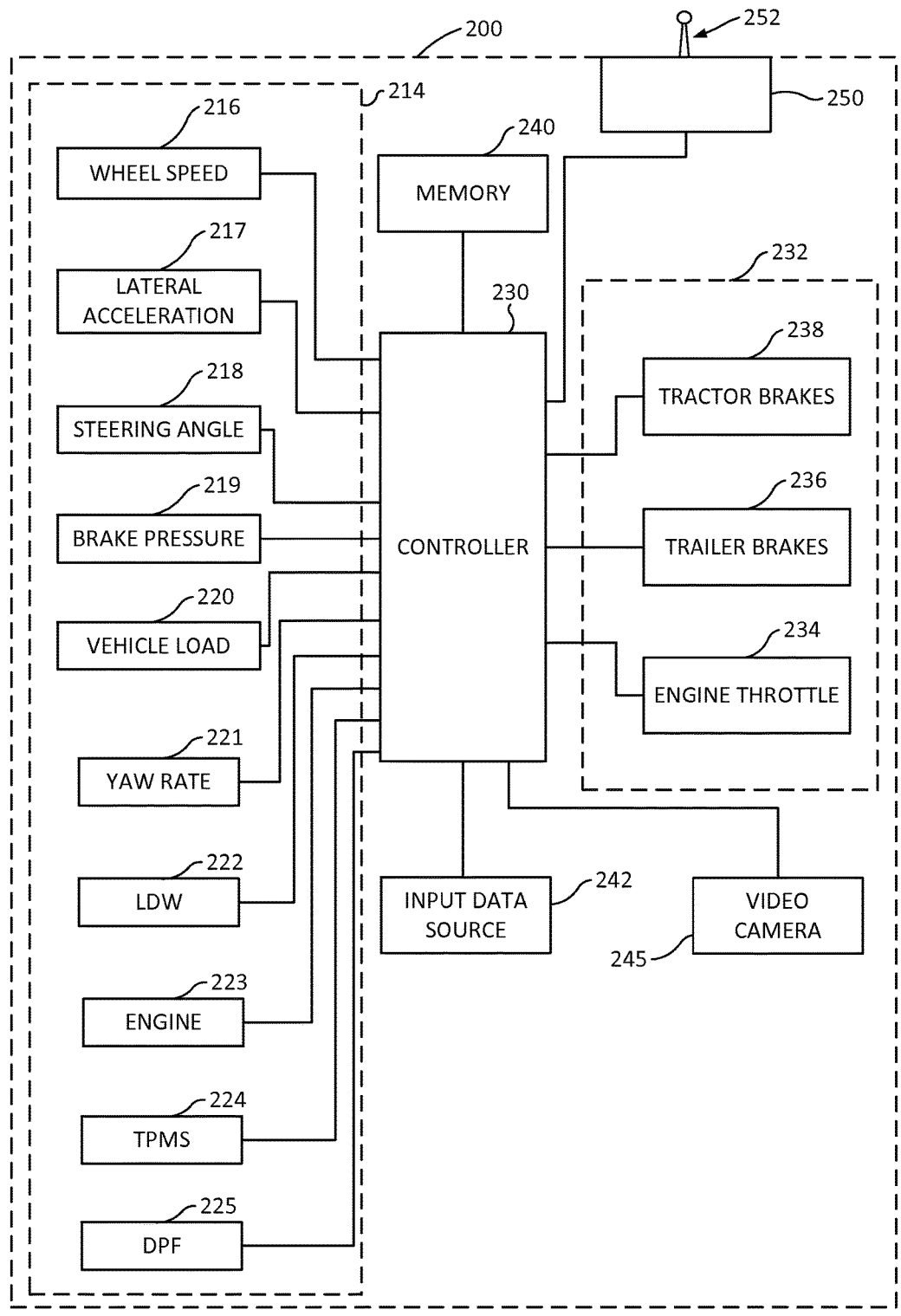
FIG. 2 is a schematic illustration of an exemplary embodiment of a hub controller portion of the subject fleet maintenance system according to an example embodiment.

With reference next to FIG. 2, a more detailed form of the hub controller 130 and the generic subsystems 160-164 of FIG. 1 are shown as a schematic representation of an electronic module 200 portion of the subject system for a commercial vehicle 102 according to principles of the example embodiment is illustrated. The electronic module 200 may be a single electronic control unit of a selected vehicle subsystem such as, for example, an ECU of an ABS or it may be an ECU of or for the overall vehicle. The electronic module 200 of the example illustrated, however, is adapted to detect, monitor, and report a variety of operational parameters and conditions of the commercial vehicle and the driver's interaction therewith, and to selectively intervene and take corrective action as may be needed or desired such as, for example, to maintain vehicle stability. In the exemplary embodiment of FIG. 2, the electronic module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, one or more engine condition sensors 223, a tire pressure (TPMS) monitoring system 224, and a Diesel Particulate Filter (DPF) system 225. Although the electronic module 200 illustrated in the example embodiment includes a set of functional components it is to be appreciated that the electronic module 200 may also utilize less than the set of functional components shown or, as necessary or desired, it may include additional devices or sensors not described in the exemplary embodiment, or combine one or more devices or sensors into a single unit. The methods, apparatus, and systems of the example embodiments are portable to vehicles of all levels of sophistication.

The electronic module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value. The controller 230 may also include one or more outputs for delivering a control signal to one or more vehicle systems 232 based on the comparison. The control signal may instruct the vehicle systems 232 to intervene in the operation of the vehicle to initiate corrective action, and then report this corrective action to the host 104 (FIG. 1). For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. In a tractor-trailer arrangement, the controller 230 may engage the brakes on one or more wheels of a trailer portion of the vehicle 236 and the brakes on one or more wheels of a tractor portion of the vehicle 238, and then report this corrective action to the host 104 (FIG. 1). A variety of corrective actions may be possible and multiple corrective actions may be initiated at the same time.

The controller 230 may also include a memory portion 240 for storing and accessing system information such as, for example, the system control logic and control tuning. The memory portion 240, however, may be separate from the controller 230. The sensors 214 and controller 230 may be part of a preexisting system or use components of a preexisting system. For example, the Bendix® ABS-6TM Advanced Antilock Brake Controller with ESP® Stability System available from Bendix Commercial Vehicle Systems LLC may be installed on the vehicle. The Bendix ESP system may utilize some or all of the sensors described in FIG. 2. The logic component of the Bendix ESP system resides on the vehicle's antilock brake system electronic control unit, which may be used for the controller 230 of the present invention. Therefore, many of the components to support the electronic module 200 of the present invention may be present in a vehicle equipped with the Bendix ESP system, thus, not requiring the installation of additional components. The electronic module 200, however, may utilize independently installed components if desired.

The electronic module 200 may also include a source of input data 242 indicative of a configuration/condition of a commercial vehicle and/or including one of more software update modules. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but is not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the electronic module 200 may select a tuning that makes the system more sensitive (i.e. intervene earlier than would occur for a single trailer condition). The control tuning may be, for example, specifically defined to optimize the performance of the electronic module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle 102 (FIG. 1) such as, for example, one video camera on each corner of the vehicle 102.

Still yet further, the electronic module 200 may also include a transmitter module 250 such as, for example, a radio frequency (RF) transmitter including one or more antennas 252 for wireless communication of the one or more various vehicle configuration and/or condition data to one or more destinations such as, for example, to one or more wireless services having a corresponding receiver and antenna. The controller 230 is operative to receive software update data and to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 217 may be combined with the data from the steering angle sensor 218 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, and DPF operation.

Figure 3:
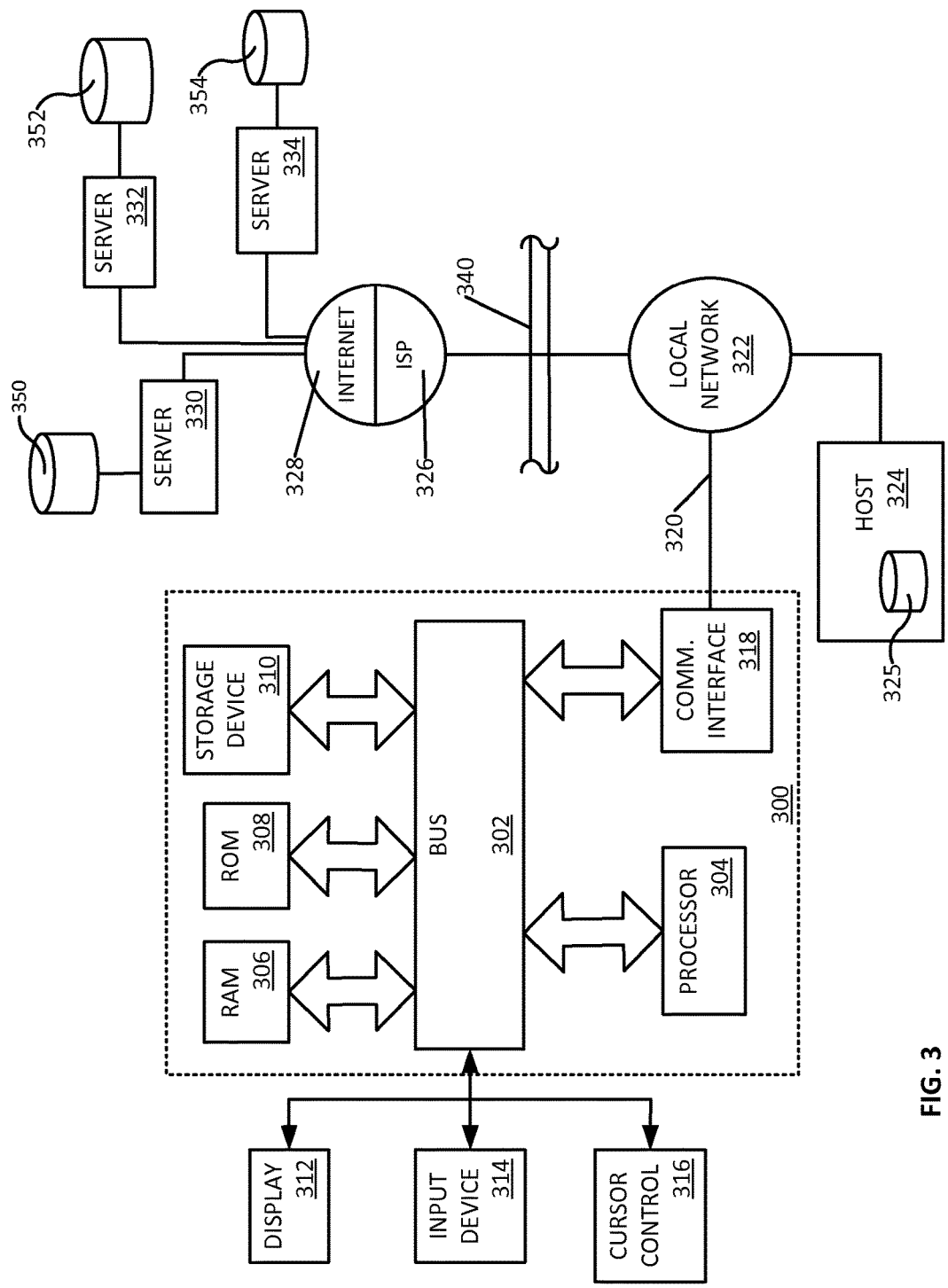
FIG. 3 is a block diagram that illustrates a computer system suitable for executing embodiments of one or more software systems or modules that perform fleet software maintenance and methods of monitoring and updating software components of fleet vehicles according to an example embodiment.

FIG. 3 is a block diagram that illustrates a detailed computer system 300 suitable for executing embodiments of one or more software systems or modules such as, for example, the hub controller 130, the plurality of subsystems 160-164 and the controller 230 that perform fleet software maintenance according to the example embodiments of the subject application. The example system includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for maintaining software components of vehicles in a fleet wherein the computer system 300 is adapted for accessing, aggregating, manipulating and displaying information from multiple remote resources such as, for example, directly from one or more host servers 330, 332, 334 or 104 (FIG. 1) supporting the multiple fleet vehicles 102 and indirectly from one or more associated multiple wireless services (not shown). Further, the embodiments described herein are related to the use of computer system 300 for accessing information from the multiple sources in selective combination with internal proprietary data such as driver sensitive data, sales, costs, expense records, travel data, and the like from within a firewall 340 local to the corresponding vehicle. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

The computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet-connected example embodiment, the system 300 is operatively connected with a plurality of external public, private, governmental or commercial servers 330, 332, 334, shown collectively in FIG. 1 as one or more wireless links 110, 112, one or more wireless networks 106, and a server 104 configured to execute a web application in accordance with the example embodiment to be described below in greater detail. In the example embodiment shown, the first server 330 is coupled with a database 350 storing selected data received by a first wireless service such as, for example, data from a first telematics supplier, the second server 332 is coupled with a database 352 storing selected data received by a second wireless service such as, for example, data from a second telematics supplier, and the third server 334 is coupled with a database 354 storing selected proprietary data (shown in FIG. 1 at 140 and 150, respectively) and executable code for performing the web application. The computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although computer system 300 is shown in FIG. 3 as being connectable to a set of three (3) servers, 330, 332, and 334, those skilled in the art will recognize that computer system 300 may establish connections to multiple additional servers on Internet 328. Each such server in the example embodiments includes HTTP-based Internet applications, which may provide information to computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The computer system 300 suitably includes several subsystems or modules to perform the fleet management and driver and vehicle reporting analyses as set forth herein. A primary purpose of the subject application is to provide an improved intuitive and convenient user interface which allows a user to select parameters for performing fleet and driver management and reporting analyses, and to generate intuitive dynamic reports which allow the user to quickly interpret the driver and fleet management and reporting analysis results and to make adjustments of the parameters based on the result presentation as necessary or desired.

Figure 4:
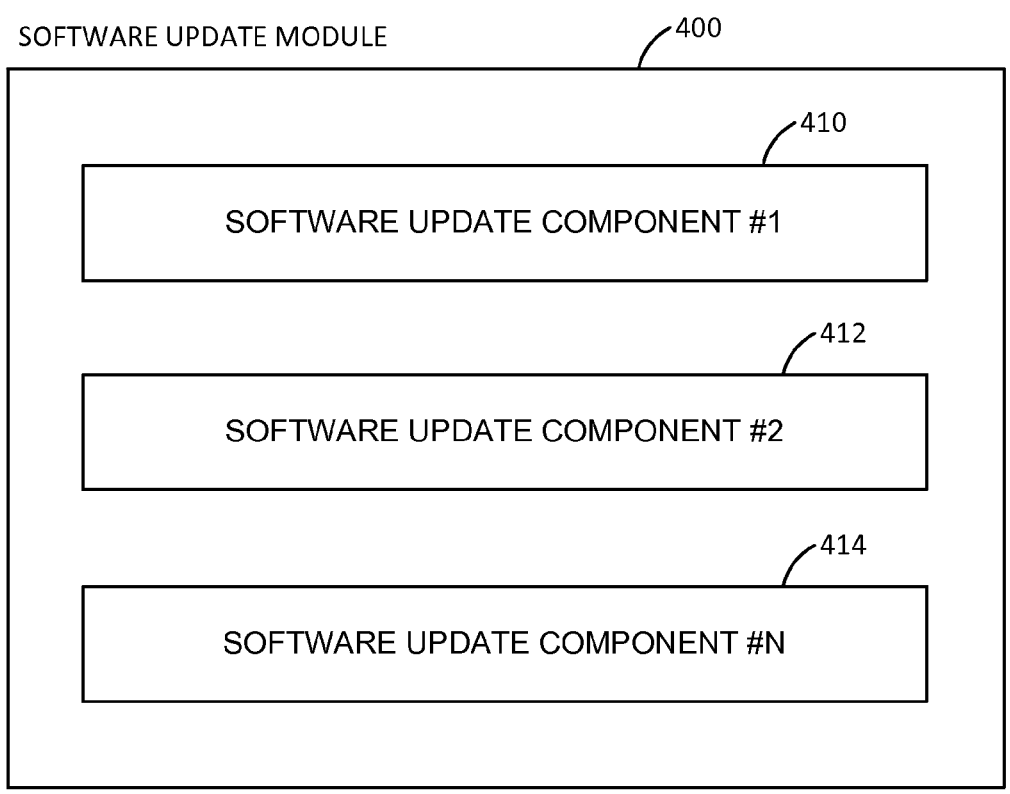
FIG. 4 is a block diagram of software update components of a selected software update module of a fleet software maintenance system in accordance with an example embodiment.

FIG. 4 is a block diagram of a selected software update module 400 including a plurality of update software components or modules 410, 412, and 414 of a fleet software maintenance system in accordance with an example embodiment. The receiver circuit 132 of the hub controller 130 (FIG. 1) is configured to receive a software update module 400 comprising a plurality of update software components or modules 410, 412, and 414, each of the plurality of update software components or modules 410, 412, and 414 being directed to updating corresponding one or more of a plurality of subsystem software components 160d-164d stored in the memories 160b-164b of respective subsystem devices 160-164 of the associated motor vehicle 102 operatively coupled with the hub controller 130.

In accordance with the example embodiment, the processor 140 of the hub controller 130 (FIG. 1) is configured to execute code stored in the memory 142 for determining an update interdependence relationship between the software update modules 410, 412, and 414 of the software update module 400. In accordance with one example, the hub controller may determine that the first software update module 410 of the plurality of update software components requires the second software update module 412 for operation of the first update software component 410. In this case, for example, the hub controller 130 is configured to selectively update the plurality of subsystem software components with the plurality of software update components in accordance with the update interdependence relationship wherein the second subsystem software component is updated with the second software update component 412 prior to the first subsystem software component being updated with the first update software component 410.

In accordance with a further example embodiment, the processor 140 of the hub controller 130 is configured to execute code stored in the memory 142 for determining a plurality of estimated update time parameters representative of a corresponding plurality of update time periods required for updating the plurality of subsystem software components 160d-164d of the subsystem devices 160-164 of the motor vehicle 102 with the plurality of software update components 410, 412, and 414 of the software update module 400. In some cases, the window time period available for updating the plurality of subsystem software components of the motor vehicle with the plurality of update software components of the software update module while the motor vehicle is in the predetermined safe operational mode, such as during DPF regeneration, is less than the time needed to perform updates to all of the components 410, 412, and 414, wherein the hub controller is adapted to select a subset of the components 410, 412, and 414 for updating. The hub controller defers updating others of the plurality of subsystem software components not in the first set, and stores the others of the plurality of subsystem software components not in the first set in the memory of the hub controller.

Figure 5:
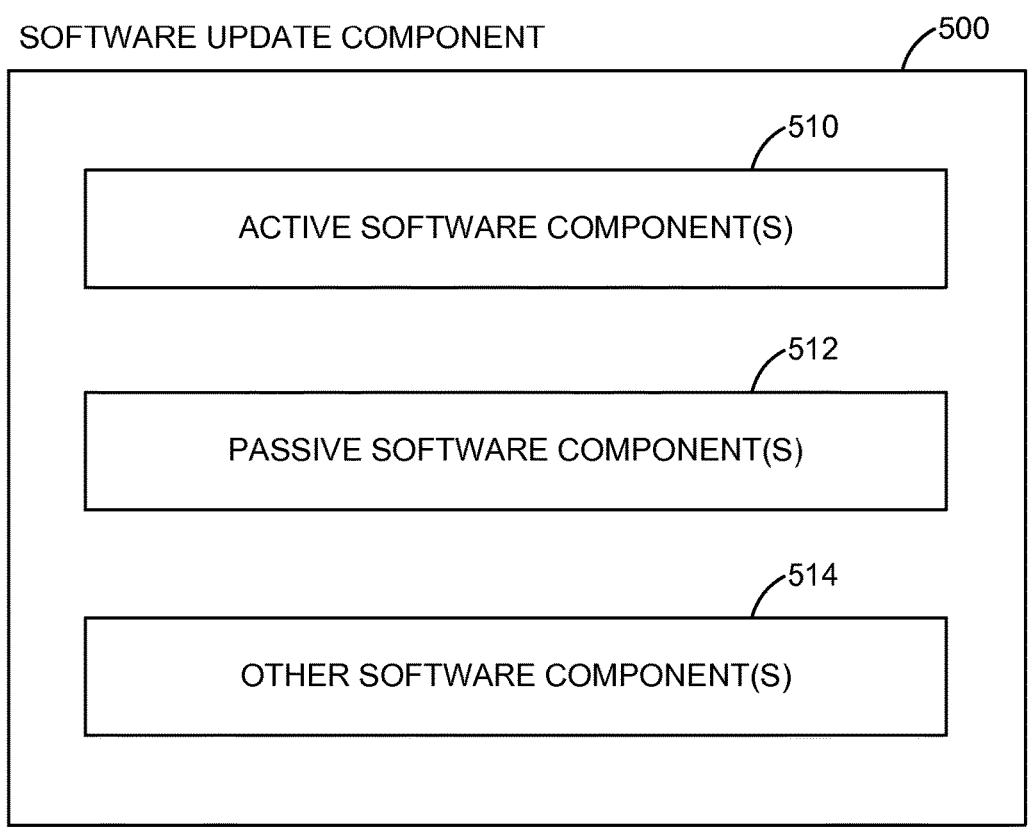
FIG. 5 is a block diagram of various software components of an software update component in accordance with an example embodiment.

FIG. 5 is a block diagram of various software components 510, 512, and 514 of a representative update software component 500 in accordance with an example embodiment. The software components 510, 512, and 514 may include one or more of each of active 510, passive 512, or other components 514. Active software components 510 may include executable code segments, for example, and passive software components 512 may include parameters, databases or other collections of data or the like used by the active software components, for example. Other software components 514 may include software update version data relating to the software version levels of the active or passive components or relating to hardware and/or firmware installed in the ECUs.

Figure 6:
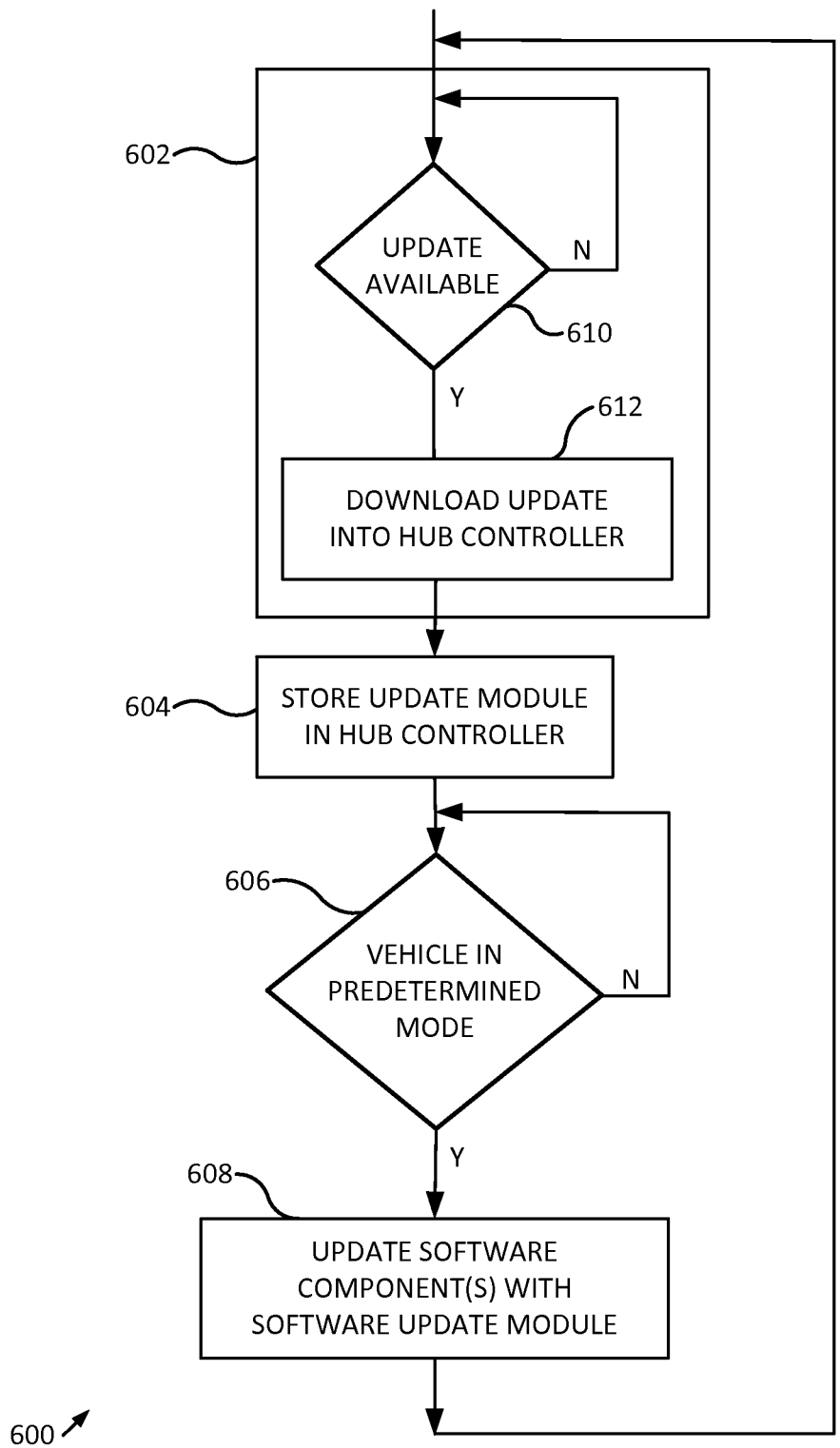
FIG. 6 is a flow chart illustrating a method of updating software components in coordination with operational modes of a motor vehicle in accordance with an example embodiment.

FIG. 6 is a flow chart illustrating a method 600 of updating software components in coordination with operational modes of a motor vehicle in accordance with an example embodiment. With reference now to that Figure, in the example embodiment, the hub controller 130 of the associated motor vehicle 102 is configured to execute logic stored in the memory 142 thereof for performing an operation 600 of coordinating an update of at least one software component of the motor vehicle with an operational condition of the motor vehicle. In a first step 602, the hub controller 130 receives, by the receiver circuit 132 of the hub controller a telematic download via the network 106 of a software update module 400 (FIG. 4), and stores the software update module in the memory 142 of the hub controller 130 in step 604. Further, the hub controller 130 is operable to determine in step 606 by the processor 140 of the hub controller an operational condition of the motor vehicle 102. Thereafter, in step 608, the hub controller selectively updates the at least one software component of selected one or more of the motor vehicle subsystems 160-164 by the processor with the software update module responsive to the operational condition of the motor vehicle being in a predetermined safe operational mode permitting the updating without danger to a driver operating the motor vehicle.

More particularly, in accordance with the example embodiment, the hub controller determines in step 606 whether the vehicle is in a DPF regeneration cycle or mode of operation. The hub controller receives a signal from an associated diesel particulate filter (DPF) regeneration subsystem device of the motor vehicle, preferably via the J1939 bus 150, wherein the signal is representative of the DPF regeneration device commencing a DPF regeneration operation. Alternatively, the signal may simply represent an active DPF regeneration operation in the vehicle rather than an initiation event, wherein the signal is representative of the DPF regeneration device performing a DPF regeneration operation. In the example embodiment, the updating in step 608 includes updating at least one software component of the motor vehicle by the processor 140 with the software update module 400 (FIG. 4) responsive to receiving the signal representative of the DPF regeneration subsystem device commenced or is actively using and/or executing the DPF regeneration operation.

In accordance with a further embodiment, the hub controller is configured to execute logic for determining in step 610 whether an update is available for telematics download from the host 104. If an update is available, the controller downloads the update data via the network 106 and into the hub controller for controller download into the respective one or more subsystems 160-164 of the vehicle. The controller download to the subsystems may be by the local J1939 bus, for example.

Figure 7:
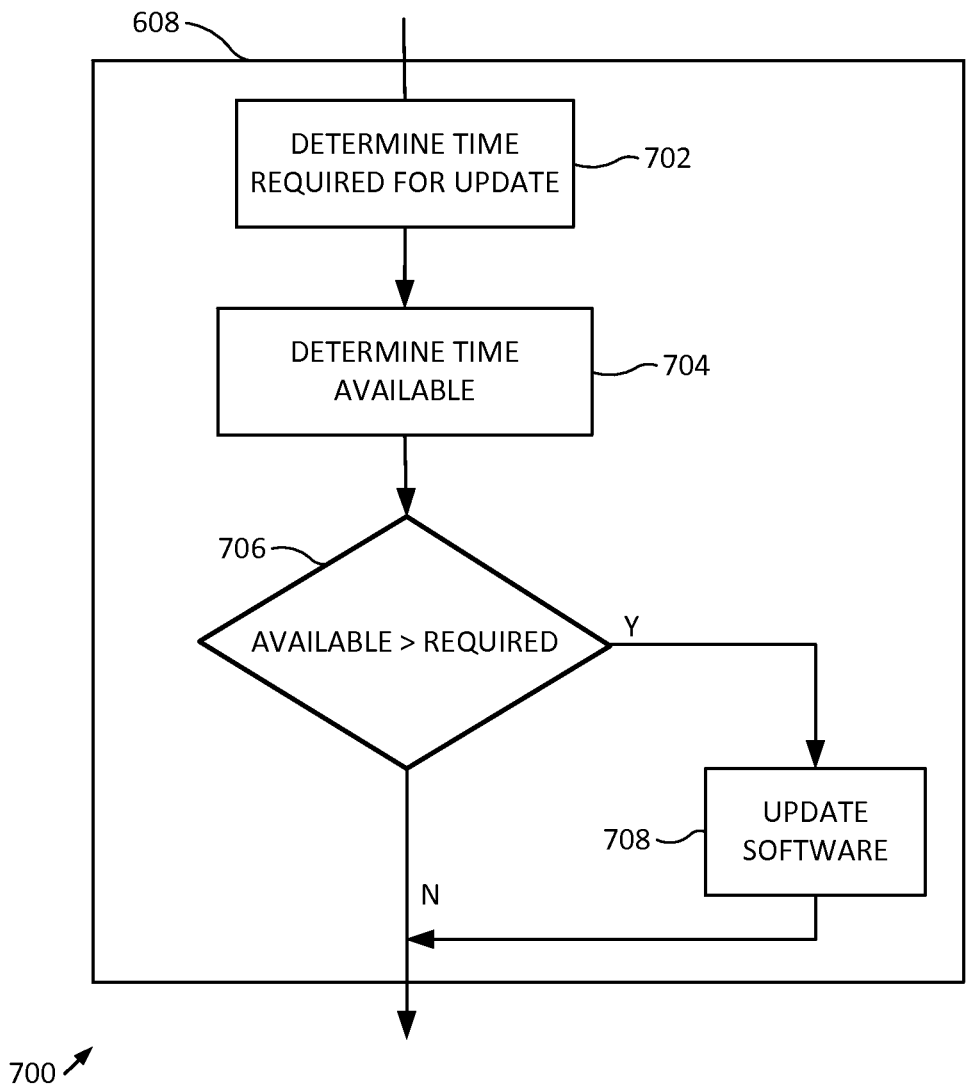
FIG. 7 is a flow chart illustrating a method of updating software components in coordination with operational modes of a motor vehicle in accordance with a further example embodiment.

FIG. 7 is a flow chart illustrating a method 700 of updating software components in coordination with operational modes of a motor vehicle in accordance with a further example embodiment. With reference now to that Figure, in the example embodiment, the hub controller 130 of the associated motor vehicle 102 (FIG. 1) is configured to execute logic stored in the memory 142 thereof for performing an operation 700 within the updating in step 608 (FIG. 6) of coordinating an update of at least one software component of the motor vehicle with an operational condition of the motor vehicle. In step 702 the processor of the hub controller determines an estimated update time parameter representative of an update time period required for updating the at least one software component of the motor vehicle with the software update module. In step 704 the processor of the hub controller determines an estimated safe operational mode time parameter representative of a window time period available for updating the at least one software component of the motor vehicle with the software update module while the motor vehicle is in the predetermined safe operational mode. In the example embodiment, the predetermined safe operational mode is during DPF regeneration. A determination is made by the processor at step 706 whether the time available for the update is greater than the time required for the update. In the example embodiment, the updating comprises selectively updating the at least one software component of the motor vehicle by the processor with the software update module responsive to a predetermined relative difference at step 706 between the estimated safe operational mode time parameter representative of the window time period available for updating the at least one software component and the estimated update time parameter representative of the update time period required for updating the at least one software component. Essentially, in accordance with the example embodiment, the software component is updated only when there is an adequate time window provided during DPF regeneration.

Figure 8:
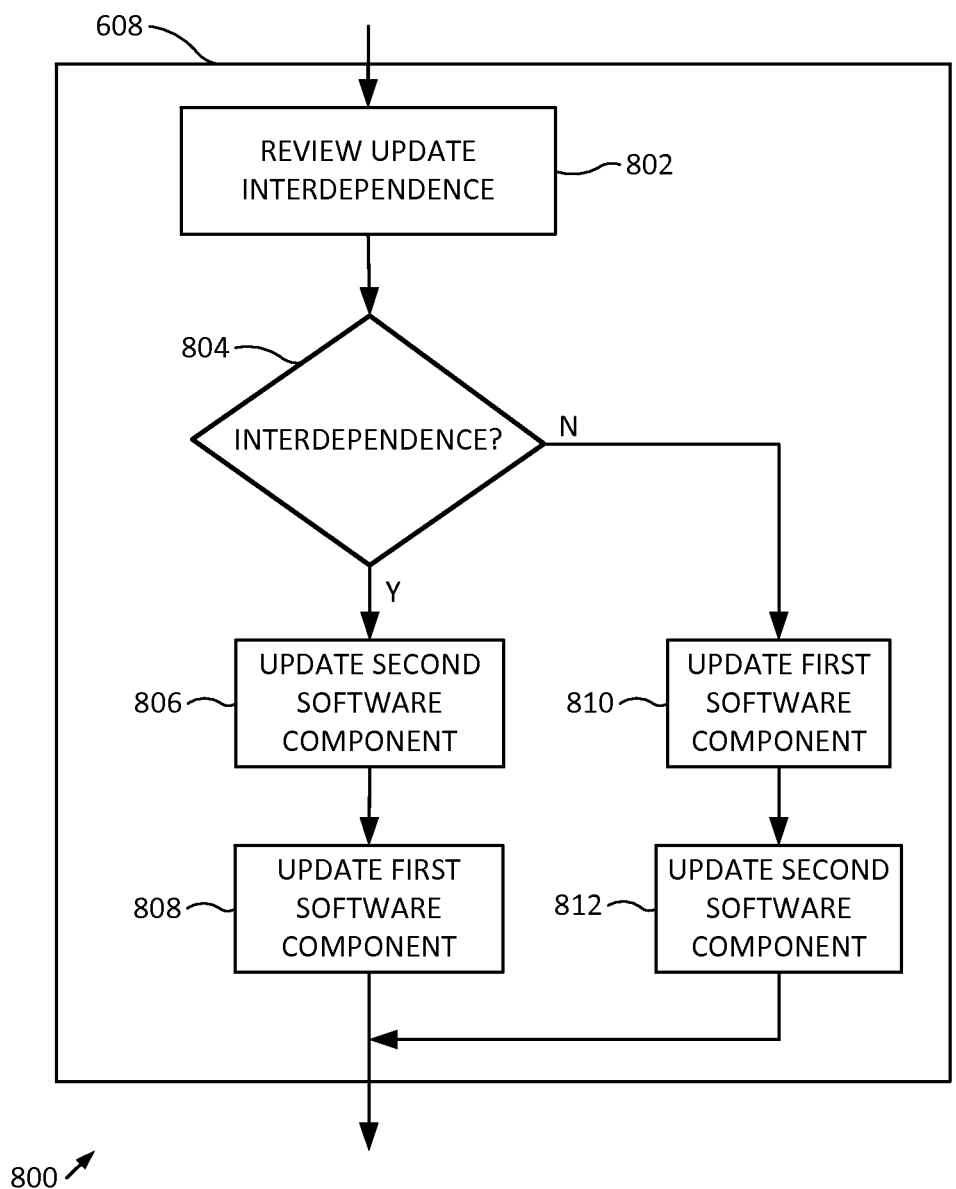
FIG. 8 is a flow chart illustrating a method of updating software components in coordination with operational modes of a motor vehicle in accordance with a further example embodiment.

FIG. 8 is a flow chart illustrating a method 800 of updating software components in coordination with operational modes of a motor vehicle in accordance with a further example embodiment. With reference now to that Figure, in the example embodiment, the hub controller 130 of the associated motor vehicle 102 (FIG. 1) is configured to execute logic stored in the memory 142 thereof for performing an operation 800 within the updating in step 608 (FIG. 6) of coordinating an update of at least one software component of the motor vehicle with an operational condition of the motor vehicle. In step 802 the processor of the hub controller reviews a potential for update interdependence between updating first and second software components in the vehicle subsystems. For example, a radar subsystem parameter may need to be updated before a driver warning subsystem parameter can be updated. A determination is made by the processor at step 804 whether an update interdependence between the first and second software component exists. When an update interdependence exists, the processor updates the second software component at 806 before updating the first software component at 808, thus essentially performing in an order in accordance with the update interdependence rather than in accordance with the order in which the updates were received. When an update interdependence does not exist as determined at 804, the processor updates the first software component at 810 before updating the second software component at 812, thus essentially performing the update in an order in accordance with the order in which the updates were received.

Figure 9:
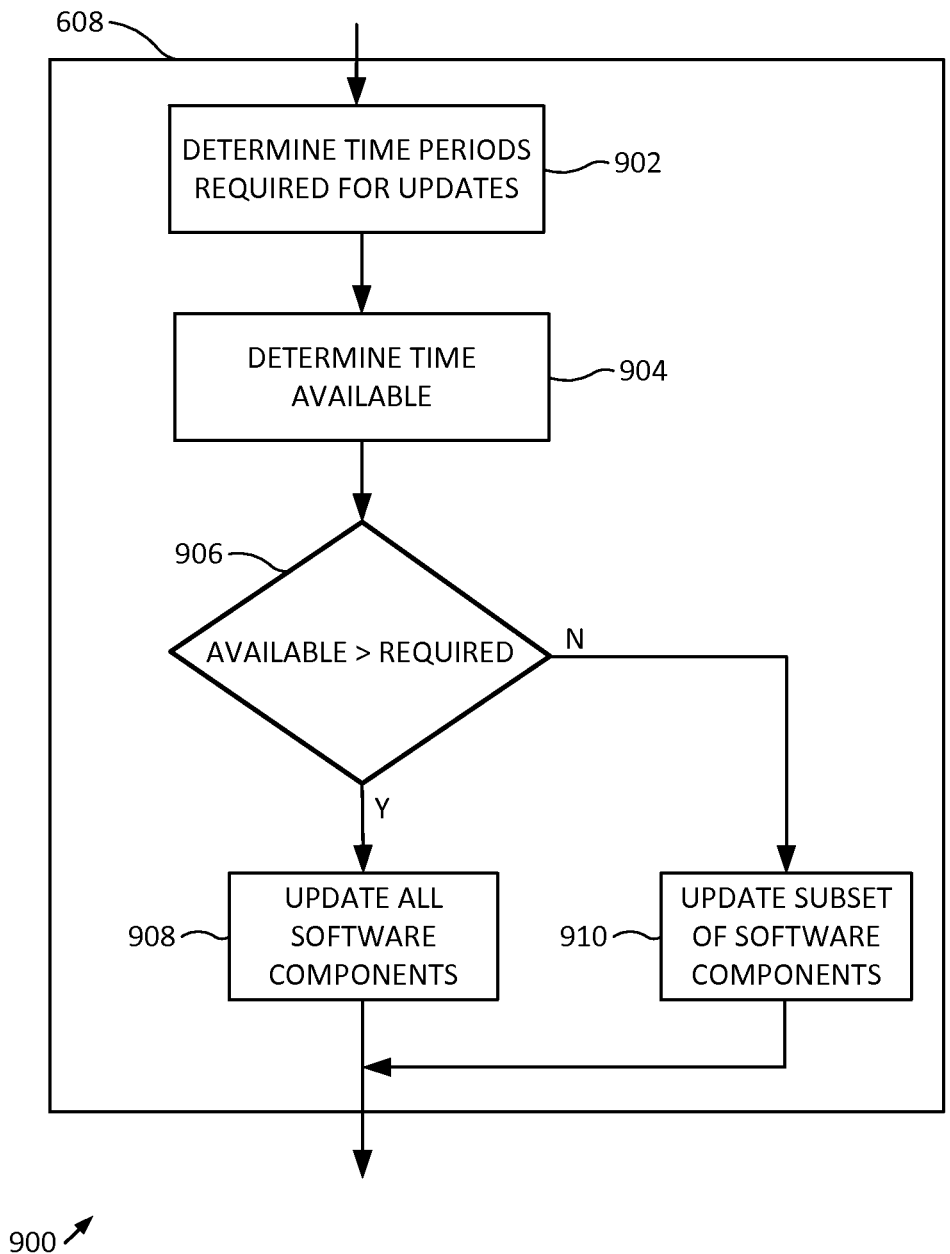
FIG. 9 is a flow chart illustrating a method of updating software components in coordination with operational modes of a motor vehicle in accordance with a further example embodiment.

FIG. 9 is a flow chart illustrating a method 900 of updating software components in coordination with operational modes of a motor vehicle in accordance with a further example embodiment. With reference now to that Figure, in the example embodiment, the hub controller 130 of the associated motor vehicle 102 is configured to execute logic stored in the memory 142 (FIG. 1) thereof for performing an operation 900 within the updating in step 608 (FIG. 6) of coordinating an update of a plurality of software components of the motor vehicle with an operational condition of the motor vehicle. In step 902 the processor of the hub controller 130 determines estimated update time parameters representative of update time periods required for updating a plurality of software components of the motor vehicle with the software update module. In step 904 the processor of the hub controller determines an estimated safe operational mode time parameter representative of a window time period available for updating the plurality of software components of the motor vehicle with the software update module while the motor vehicle is in the predetermined safe operational mode. In the example embodiment, the predetermined safe operational mode is during DPF regeneration. A determination is made by the processor at step 906 whether the time available for the update is greater than the time required for the updates. In the example embodiment, the updating comprises selectively updating at step 908 the plurality of software components of the motor vehicle by the processor with the software update module responsive to a predetermined relative difference at step 906 between the estimated safe operational mode time parameter representative of the window time period available for updating the software components and the estimated update time parameter representative of the update time period required for updating the plurality of software components. Further in the example embodiment, the updating comprises updating at step 910 only selected ones of the plurality of software components of the motor vehicle by the processor with the software update module responsive to a predetermined relative difference at step 906 between the estimated safe operational mode time parameter representative of the window time period available for updating the software components and the estimated update time parameter representative of the update time period required for updating the software components. Essentially, in accordance with the example embodiment, the software components are all updated only when there is an adequate time window provided during DPF regeneration. Conversely, in accordance with the example embodiment, only selected one or more of the software components are updated when there is an inadequate time window provided during DPF regeneration for updating all of the software components.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

Having described the example embodiments, we claim:

1. A method in a hub controller of an associated motor vehicle for coordinating an update of at least one software component of the associated motor vehicle with an operational condition of the motor vehicle, the method comprising:
    receiving by a receiver circuit of the hub controller a software update module;
    storing the software update module in a memory of the hub controller;
    determining by a processor of the hub controller the operational condition of the associated motor vehicle, wherein the determining comprises receiving a signal from an associated diesel particulate filter (DPF) regeneration subsystem device of the associated motor vehicle, the signal being representative of the DPF regeneration subsystem device performing a DPF regeneration operation; and,
    selectively updating the at least one software component of the associated motor vehicle by the processor with the software update module from the memory responsive to receiving the signal representative of the DPF regeneration subsystem device performing the DPF regeneration operation.

2. The method according to claim 1, further comprising:
    determining by the processor of the hub controller an estimated update time parameter representative of an update time period required for updating the at least one software component of the motor vehicle with the software update module; and, determining by the processor of the hub controller an estimated safe operational mode time parameter representative of a window time period available for updating the at least one software component of the motor vehicle with the software update module while the operational condition of the associated motor vehicle is in a predetermined safe operational mode permitting the updating, wherein the updating comprises selectively updating the at least one software component of the motor vehicle by the processor with the software update module responsive to a predetermined relative difference between the estimated safe operational mode time parameter representative of the window time period available for updating the at least one software component and the estimated update time parameter representative of the update time period required for updating the at least one software component.

3. The method according to claim 1, wherein:

the receiving comprises receiving by the receiver circuit of the hub controller a software update module comprising a plurality of software update modules, each of the plurality of software update modules being directed to updating corresponding ones of a plurality of subsystem software components of subsystem devices of the associated motor vehicle operatively coupled with the hub controller; and, the updating comprises selectively updating at least one of the plurality of subsystem software components of at least one subsystem device of the associated motor vehicle by the processor with a corresponding software update module of the plurality of software update modules responsive to determining the operational condition of the associated motor vehicle being in a predetermined safe operational mode permitting the updating.

4. The method according to claim 3, further comprising:

determining by the processor of the hub controller an update interdependence relationship between first and second software update modules of the plurality of software update modules, wherein the second software update module requires the first software update module for operation of the second software update module; and, selectively updating the plurality of subsystem software components with the plurality of software update modules in accordance with the update interdependence relationship wherein a first subsystem software component is updated with the first software update module prior to a second subsystem software component being updated with the second software update module.

5. The method according to claim 1, wherein:

the receiving comprises receiving by the receiver circuit of the hub controller a software update module comprising a plurality of software update modules, each of the plurality of software update modules being directed to updating corresponding ones of a plurality of subsystem software components of subsystem devices of the associated motor vehicle; and, the updating comprises selectively updating each of the subsystem software components of the subsystem devices of the associated motor vehicle by the processor with a corresponding one of the plurality of software update modules of the software update module responsive to the operational condition of the associated motor vehicle being in a predetermined safe operational mode permitting the updating.

6. The method according to claim 1, wherein:

the updating comprises selectively updating at least one software component of the hub controller with the software update module responsive to determining the operational condition of the associated motor vehicle being in a predetermined safe operational mode permitting the updating.

7. The method according to claim 1, wherein:

the receiving comprises receiving the software update module by a receiver circuit of an electronic control unit of an anti-lock brake system of the associated motor vehicle;

the storing comprises storing the software update module in a memory of the electronic control unit of the anti-lock brake system;

the determining comprises determining by a processor of the electronic control unit of the anti-lock brake system the operational condition of the associated motor vehicle; and, the updating comprises selectively updating the at least one software component of the associated motor vehicle by the processor of the electronic control unit of the anti-lock brake system with the software update module responsive to determining the operational condition of the associated motor vehicle being in a predetermined safe operational mode permitting the updating.

8. The method according to claim 1, wherein:

the determining comprises determining by the processor the operational condition of the associated motor vehicle being in a predetermined safe operational mode permitting the updating by:

determining a condition of an ignition circuit of the associated motor vehicle being deactivated; and, determining a condition of an electronic communication network of the associated motor vehicle operatively coupled with the hub controller being functionally activated.

9. The method according to claim 1, wherein:

the determining comprises determining by the processor the operational condition of the associated motor vehicle being in a predetermined safe operational mode permitting the updating by:

determining a first software component of the at least one software components of the associated motor vehicle being not essential to normal operation of the associated motor vehicle during the updating; and, selectively updating the first software component with the software update module during the normal operation of the associated motor vehicle.

10. A method in a hub controller of an associated motor vehicle for coordinating an update of at least one software component of the associated motor vehicle with an operational condition of the motor vehicle, the method comprising:

receiving by the receiver circuit of the hub controller a software update module comprising a plurality of software update modules, each of the plurality of software update modules being directed to updating corresponding ones of a plurality of subsystem software components of subsystem devices of the associated motor vehicle operatively coupled with the hub controller;

storing the software update module in a memory of the hub controller;

determining by a processor of the hub controller the operational condition of the associated motor vehicle;

selectively updating at least one of the plurality of subsystem software components of at least one subsystem device of the associated motor vehicle by the processor with a corresponding software update module of the plurality of software update modules responsive to determining the operational condition of the associated motor vehicle being in a predetermined safe operational mode permitting the updating;

determining by the processor of the hub controller a plurality of estimated update time parameters representative of a corresponding plurality of update time periods required for updating the plurality of subsystem software components of the subsystem devices of the associated motor vehicle with the plurality of software update modules of the software update module; and, determining by the processor of the hub controller an estimated safe operational mode time parameter representative of a window time period available for updating the plurality of subsystem software components of the associated motor vehicle with the plurality of software update modules of the software update module while the motor vehicle is in the predetermined safe operational mode, wherein the updating comprises:
updating a first set of the plurality of subsystem software components of the subsystem devices of the associated motor vehicle with a corresponding first set of the plurality of software update modules of the software update module in accordance with a sum of the estimated update time parameters corresponding to the first set of the plurality of update software components being less than the estimated safe operational mode time parameter representative of the window time period available for the updating;

deferring updating a second set of the plurality of subsystem software components not in the first set; and, storing in the memory of the hub controller a second set of the plurality of software update modules of the software update module not in the first set of the plurality of software update modules and corresponding with the second set of the plurality of subsystem software components.

11. A method in a hub controller of an associated motor vehicle for coordinating an update of at least one software component of the associated motor vehicle with an operational condition of the motor vehicle, the method comprising:

receiving by the receiver circuit of the hub controller a software update module comprising a plurality of software update modules, each of the plurality of software update modules being directed to updating corresponding ones of a plurality of subsystem software components of subsystem devices of the associated motor vehicle operatively coupled with the hub controller;

storing the software update module in a memory of the hub controller;

determining by a processor of the hub controller the operational condition of the associated motor vehicle;

selectively updating at least one of the plurality of subsystem software components of at least one subsystem device of the associated motor vehicle by the processor with a corresponding software update module of the plurality of software update modules responsive to determining the operational condition of the associated motor vehicle being in a predetermined safe operational mode permitting the updating;

determining by the processor of the hub controller a plurality of estimated update time parameters representative of a corresponding plurality of update time periods required for updating the plurality of subsystem software components of the subsystem devices of the associated motor vehicle with the plurality of software update modules of the software update module; and, determining by the processor of the hub controller an estimated safe operational mode time parameter representative of a window time period available for updating the plurality of subsystem software components of the associated motor vehicle with the plurality of software update modules of the software update module while the associated motor vehicle is in the predetermined safe operational mode, wherein the updating comprises updating a first set of the plurality of subsystem software components of the subsystem devices of the associated motor vehicle with a corresponding first set of the plurality of software update modules of the software update module in accordance with a sum of estimated update time parameters corresponding to the first set of the plurality of update software components being less than the estimated safe operational mode time parameter representative of the window time period available for the updating.

12. A hub controller for coordinating an update of at least one software component of an associated motor vehicle with an operational condition of the motor vehicle, the hub controller comprising:

a receiver circuit operatively coupled with an associated network, the receiver circuit being configured to receive a software update module from the associated network;

a memory operatively coupled with the receiver circuit and being configured to store the software update module; and, a processor operatively coupled with the receiver circuit and the memory, and the processor being configured to receive a signal from an associated diesel particulate filter (DPF) regeneration subsystem device of the associated motor vehicle, the signal being representative of the DPF regeneration device performing a DPF regeneration operation, wherein the processor selectively updates the at least one software component of the associated motor vehicle with the software update module responsive to receiving the signal representative of the DPF regeneration subsystem device performing the DPF regeneration operation.

13. The hub controller according to claim 12, wherein:
the processor is configured to determine an estimated update time parameter representative of an update time period required for updating the at least one software component of the associated motor vehicle with the software update module;

the processor is configured to determine an estimated safe operational mode time parameter representative of a window time period available for updating the at least one software component of the motor vehicle with the software update module while the motor vehicle is in the predetermined safe operational mode; and, wherein the processor is configured to selectively update the at least one software component of the motor vehicle with the software update module responsive to a predetermined relative difference between the estimated safe operational mode time parameter representative of the window time period available for updating the at least one software component and the estimated update time parameter representative of the update time period required for updating the at least one software component.

14. The hub controller according to claim 12, wherein:
the processor is configured to receive a software update module comprising a plurality of software update modules, each of the plurality of software update modules being directed to updating corresponding ones of a plurality of subsystem software components of subsystem devices of the associated motor vehicle operatively coupled with the hub controller; and,
the processor is configured to selectively update at least one subsystem software component of a subsystem device of the motor vehicle with a corresponding software update module of the plurality of software update modules responsive to the operational condition of the motor vehicle being in a predetermined safe operational mode permitting the updating.

15. The hub controller according to claim 14, wherein:
the processor is configured to determine an update interdependence relationship between first and second software update modules of the plurality of software update modules, wherein the second software update module requires the first software update module for operation of the second software update module; and,
the processor is configured to selectively update the plurality of subsystem software components with the plurality of software update modules in accordance with the update interdependence relationship wherein a first subsystem software component is updated with the first software update module prior to a second subsystem software component being updated with the second software update module.

16. The hub controller according to claim 12, wherein:
the receiver circuit is configured to receive a software update module comprising a plurality of software update modules, each of the plurality of software update modules being directed to updating corresponding ones of a plurality of subsystem software components of subsystem devices of the associated motor vehicle operatively coupled with the hub controller; and,
the processor is configured to selectively update each of the subsystem software components of the subsystem devices of the motor vehicle with corresponding software update modules of the software update module responsive to the operational condition of the motor vehicle being in a predetermined safe operational mode permitting the updating.

17. The hub controller according to claim 12, wherein:
the receiver circuit comprises a transceiver configured to operably couple the receiver circuit with an associated telematics network, the receiver circuit being configured to receive the software update module from the associated telematics network by the transceiver.

18. The hub controller according to claim 12, wherein:
the receiver circuit comprises an electronic port configured to operably connect the receiver circuit with an associated serial bus network of the associated vehicle, the receiver circuit being configured to receive the software update module from the associated serial bus network by the port.

19. A hub controller for coordinating an update of at least one software component of an associated motor vehicle with an operational condition of the motor vehicle, the hub controller comprising:

a receiver circuit operatively coupled with an associated network, the receiver circuit being configured to receive a software update module from the associated network;
a memory operatively coupled with the receiver circuit and being configured to store the software update module; and,
a processor operatively coupled with the receiver circuit and the memory, wherein the processor is configured to:
determine the operational condition of the associated motor vehicle, wherein the processor selectively updates the at least one software component of the associated motor vehicle with the software update module responsive to the operational condition of the motor vehicle being in a predetermined safe operational mode permitting the updating;
receive a signal from an associated diesel particulate filter (DPF) regeneration subsystem device of the associated motor vehicle, the signal being representative of the DPF regeneration device performing a DPF regeneration operation, and update the at least one software component of the associated motor vehicle with the software update module responsive to receiving the signal representative of the DPF regeneration subsystem device performing the DPF regeneration operation;
determine a plurality of estimated update time parameters representative of a corresponding plurality of update time periods required for updating the plurality of subsystem software components of the subsystem devices of the motor vehicle with the plurality of software update modules of the software update module;
determine an estimated safe operational mode time parameter representative of a window time period available for updating the plurality of subsystem software components of the motor vehicle with the plurality of software update modules of the software update module while the motor vehicle is in the predetermined safe operational mode; and,
wherein the processor is configured to: i) update a first set of the plurality of subsystem software components of the subsystem devices of the motor vehicle with a corresponding first set of the plurality of software update modules of the software update module in accordance with a sum of the estimated update time parameters corresponding to the first set of the plurality of software update modules being less than the estimated safe operational mode time parameter representative of the window time period available for the updating; ii) defer updating others of the plurality of subsystem software components not in the first set; and iii) store in the memory of the hub controller the others of the plurality of software update modules not in the first set of the plurality of software update modules.

20. A hub controller or coordinating an update of at least one software component of an associated motor vehicle with an operational condition of the motor vehicle, the hub controller comprising:
a receiver circuit operatively coupled with an associated network, the receiver circuit being configured to receive a software update module from the associated network;

a memory operatively coupled with the receiver circuit and being configured to store the software update module; and, a processor operatively coupled with the receiver circuit and the memory, wherein the processor is configured to:

determine the operational condition of the associated motor vehicle, wherein the processor selectively updates the at least one software component of the associated motor vehicle with the software update module responsive to the operational condition of the motor vehicle being in a predetermined safe operational mode permitting the updating;

receive a signal from an associated diesel particulate filter (DPF) regeneration subsystem device of the associated motor vehicle, the signal being representative of the DPF regeneration device performing a DPF regeneration operation, and update the at least one software component of the associated motor vehicle with the software update module responsive to receiving the signal representative of the DPF regeneration subsystem device performing the DPF regeneration operation;

determine a plurality of estimated update time parameters representative of a corresponding plurality of update time periods required for updating the plurality of subsystem software components of the subsystem devices of the motor vehicle with the plurality of software update modules of the software update module;

determine an estimated safe operational mode time parameter representative of a window time period available for updating the plurality of subsystem software components of the motor vehicle with the plurality of software update modules of the software update module while the motor vehicle is in the predetermined safe operational mode; and, update a first set of the plurality of subsystem software components of the subsystem devices of the motor vehicle with a corresponding first set of the plurality of software update modules of the software update module in accordance with a sum of the estimated update time parameters corresponding to the first set of the plurality of software update modules being less than the estimated safe operational mode time parameter representative of the window time period available for the updating.

* * * * *